United States Patent [19]

Inglee

[11] Patent Number: 4,481,417
[45] Date of Patent: Nov. 6, 1984

[54] INFRARED ENERGY DETECTION DEVICE

[75] Inventor: Clinton F. Inglee, Media, Pa.

[73] Assignee: The Boeing Company, Seattle, Wash.

[21] Appl. No.: 420,167

[22] Filed: Sep. 22, 1982

[51] Int. Cl.³ .............................................. G01J 1/00
[52] U.S. Cl. .................................... 250/338; 374/144
[58] Field of Search ............... 250/330, 334, 338, 342, 250/353; 374/104, 120, 130, 144

[56] References Cited

U.S. PATENT DOCUMENTS

| | | | |
|---|---|---|---|
| 2,694,900 | 11/1954 | Brandau | 374/144 |
| 3,426,322 | 2/1969 | Balo | 374/144 |
| 4,427,888 | 1/1984 | Galvin | 250/330 |

*Primary Examiner*—Janice A. Howell

*Attorney, Agent, or Firm*—Jones, Tullar & Cooper

[57] ABSTRACT

The infrared energy detection device is a small, battery powered radiometer which measures IR energy emitted from an engine exhaust device, compares it with programmed energy levels, and displays whether the measured level falls within acceptable limits. It is calibrated against engine torque; and, by means of green and red lights, indicates the level of IR emissions. If emissions are below a predetermined level, a green light will be illuminated. Conversely, if emissions are higher than design levels, a red light will be illuminated indicating degraded performance of the engine IR suppresor. In addition to the green and red light indication, a digital display of IR intensity is also provided.

9 Claims, 5 Drawing Figures

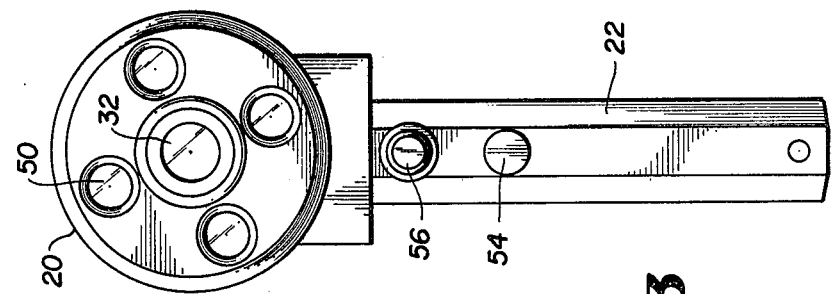
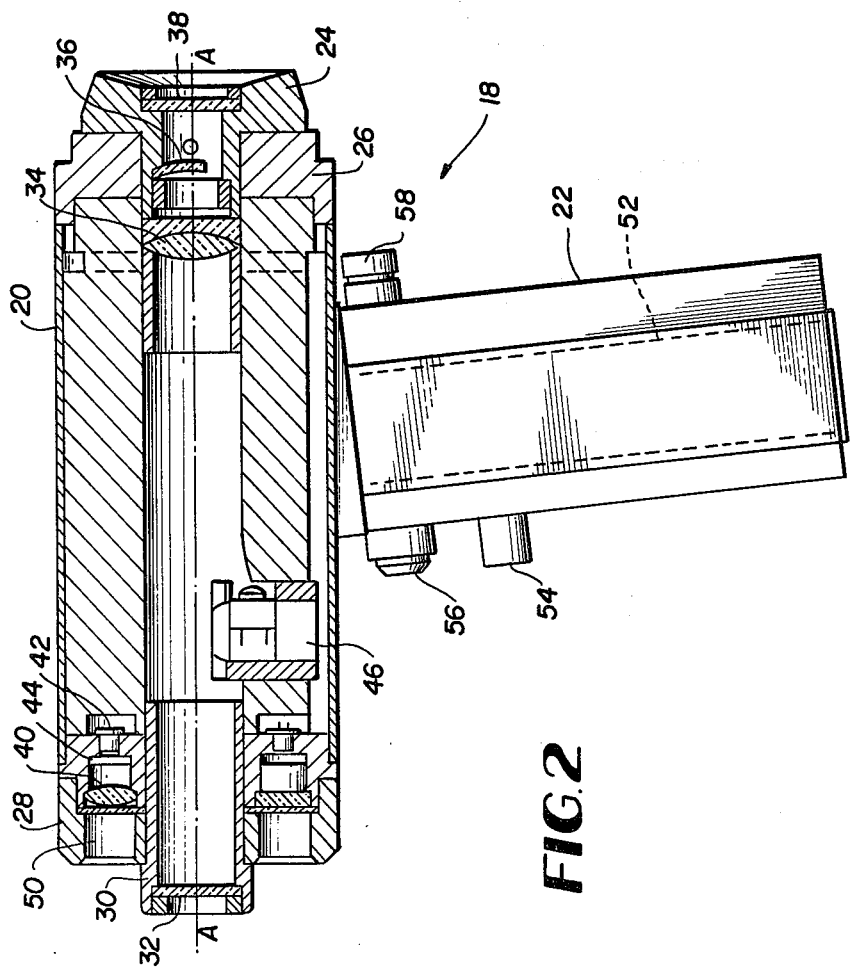

INFRARED ENERGY DETECTION DEVICE

BACKGROUND OF THE INVENTION

1. Field of the Invention

The present invention relates to a device for detecting thermal energy in the infrared spectrum. The device detects the level of the infrared thermal energy emitted from the exhaust port of an engine, and in particular an engine mounted on a helicopter.

2. Prior Art

Heat seeking missiles which home on the infrared thermal energy emitted from an engine are known, as are suppressors for suppressing the level of the thermal energy emitted to thereby break the homing connection, and consequently the threat to the aircraft. The suppressors may unexpectedly malfunction, however, resulting in a renewed threat to the safety of the aircraft.

It is not always apparent that a suppressor is malfunctioning, and it is not always a simple matter to check the operation of the suppressor because of its location. The suppressor is mounted to an engine, which in turn is typically mounted relatively high on a pylon of the helicopter. A means of checking the operation of the suppressor at ground level and from a remote location would be desirable.

It is known that an engine is a heat source and as such it emittes infrared radiation. A detection of the infrared radiation can therefore be employed as a measure of the heat intensity from the engine, and accordingly as a check on the operation of the engine suppressor. Infrared detectors are known. See, for example, U.S. Pat. Nos. 3,992,943; 4,081,678 and 4,121,459. What is needed is a detector which will detect the infrared radiation emitted by an engine while compensating for varying engine power. The detector should be portable as it will have to be used in hostile areas. It must be capable of quickly and accurately indicating the level of infrared radiation, and indicating whether or not the infrared radiation level is at a safe level for a given engine power setting.

OBJECTS AND SUMMARY OF THE INVENTION

One object of the invention is to provide a device which can check the operation of an engine suppressor from a location remote from the engine suppressor by detecting the level of infrared radiation emitted by the engine past the suppressor.

Another object of the invention is to provide a device which satisfies the previously stated object and which is portable and easily operated so that it can be used quickly and accurately, especially in hostile areas.

The present invention was developed to give crew or maintenance personnel a means of checking whether a malfunction exists in engine suppressors. The invention is embodied as a portable device which can be easily carried by an individual and even stored on one's person. The device provides the user with an easily manageable means of quickly checking the effectiveness of the engine suppressor without having to physically inspect the suppressor. The device has a remote application, focuses on the particular engine exhaust, senses the thermal energy being emitted and indicates, by an appropriate read-out, whether the thermal energy emitted is at an acceptable level or not. An acceptable level is one which is insufficient to support the generation of a homing signal. Such levels are known. The device indicates, therefore, that the suppressor is, or is not, functioning properly.

The device includes: an optical portion having a two-fold purpose of sighting the appropriate part of the suppressor through which the infrared energy passes and focusing the energy; an electronics portion which receives the focused energy and generates and operates on a proportional electrical signal; and an indicating portion which provides a dual read-out result.

BRIEF DESCRIPTION OF THE DRAWINGS

FIG. 2 is a schematic partial cross sectional view of the detector device illustrating the relative location of the various parts;

FIG. 3 is a front view of the detector device illustrating the relative location of the openings in the aperture ring;

DESCRIPTION OF A PREFERRED EMBODIMENT

Since the invention has particular application to helicopters, a preferred embodiment thereof will be described with reference to a helicopter.

Figure 1:
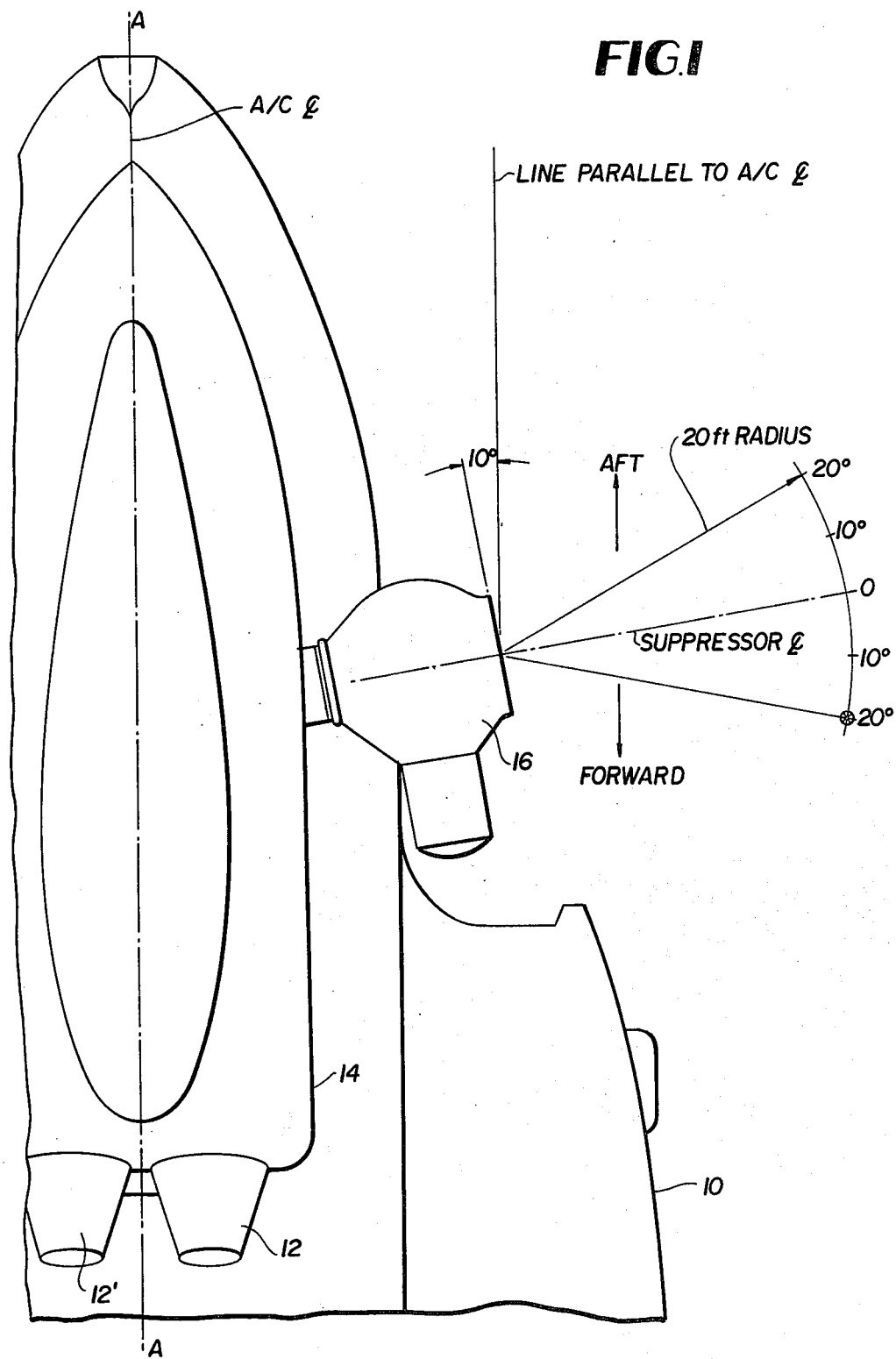
FIG. 1 is a partial schematic top view of the rear portion of a helicopter depicting two engines and the suppressor of one of the engines.

FIG. 1 depicts the rear fuselage and pylon section of a typical turbine driven tandem helicopter 10. The turbine engines 12 are mounted in the rear pylon 14 on either side of the helicopter roll axis A—A. Each engine includes an IR suppressor 16 for suppressing the IR energy emitted by its respective engine. The hand-held vulnerability detection device 18 shown in FIGS. 2 and 3 is used to evaluate the effectiveness of the suppressors 16. The procedure for effecting the evaluation is discussed hereinafter with reference to FIG. 1, subsequent to a discussion of the vulnerability detection device itself.

The vulnerability detection device 18 comprises a small, hand-held and battery powered radiometer which detects radiation energy emitted from an object, such as the suppressor 16, converts it to an electrical signal, amplifies, and displays it in the form of a digital readout. The vulnerability detection device 18 includes a cylindrical body 20 and a handgrip 22.

The cylindrical body 20 serves to mount a rotatable eyepiece 24 with a retaining ring 26, a rotatable aperture ring 28 and an aperture retainer 30 with a filter 32. Within the cylindrical body 20 are situated a target viewing optical system including a pair of lenses 34 and 36, a protective glass cover 38 and the filter 32; an infrared radiation focusing optical system including four lenses 40a–40d, mounted about the aperture retainer 30, a detector 42a–42d and a filter 44a–44d, associated with each lense and a digital display 46.

Adjacent each detector 42a–42d is a reference radiation level detector 48a–48d (FIG. 4) which together are used to establish a reference radiation level (zero setting) which is based on measuring the energy of the vulnerability detection device itself (ambient). For this purpose the aperture ring 28 is provided with four openings 50a–50d (FIG. 3) which in a first position align with lenses 40a–40d detectors 42a–42d and filters 44a–44d, and in a second position rotated relative to the first position, align with the detectors 48a–48d.

The target viewing optical system serves a dual function; as a sighting device to provide a visual image of the object being sensed, and as a device for viewing the digital display. The pair of lenses 34 and 36 are used to view the object while only the lense 34 is used to view the digital display. For this purpose the bottom portion of the lens 36 is cut off. For best results, therefore, the object should be viewed through the center or upper portion of the viewing channel defined through the cylindrical body 20, whereas the digital display should be viewed through the bottom portion of the lens 34.

The handgrip 22 houses a power supply consisting of a battery or batteries 52, an on-off switch 54, a two position zero setting gang switch 56, and a multi-position torgue switch 58 concentrically arranged with a two position read-hold switch 60.

The various switches, the power supply and the detectors are connected by appropriate electronics which are preferably mounted on two integrated circuit boards located in the cylindrical body 20. One of the circuit boards contains amplifier and suppressor indication circuits, while the other circuit board contains the digital display circuitry. The detailed illustration of these circuits is shown in FIGS. 4 and 5.

Figure 4:
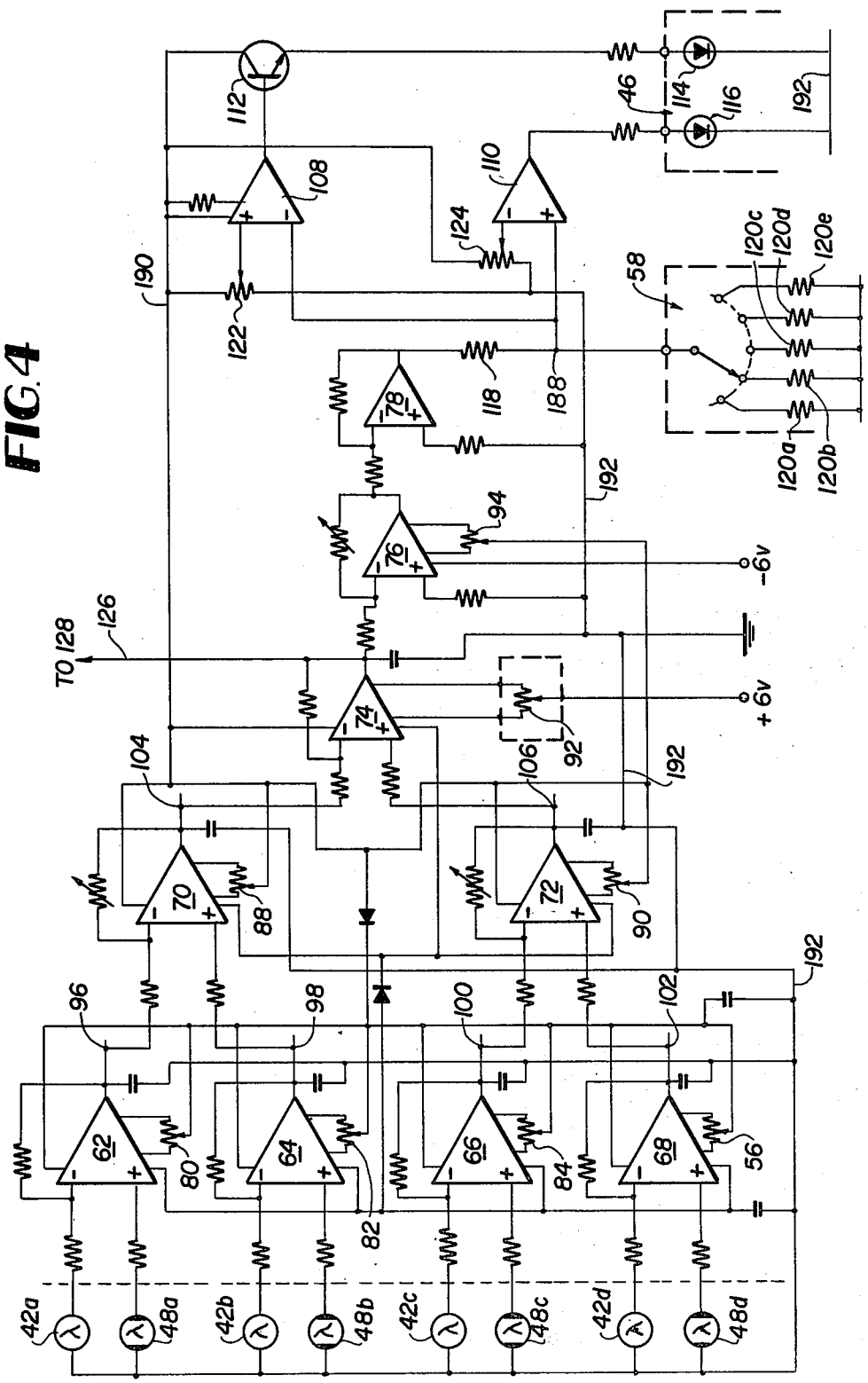
FIG. 4 is a circuit diagram of one of the two IC boards on which the amplifier and suppressor indication (one read-out) circuits are mounted.
Figure 5:
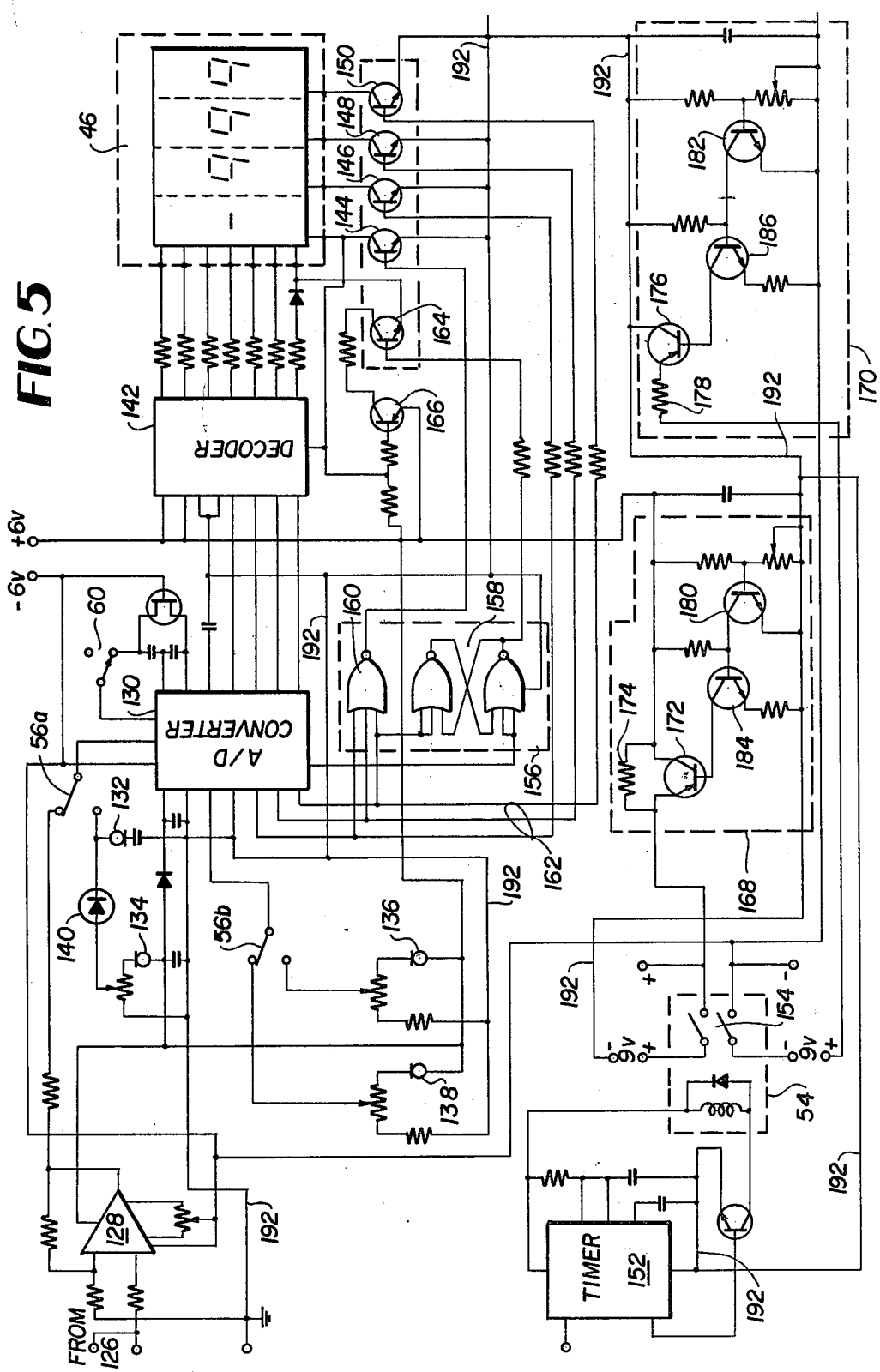
FIG. 5 is a circuit diagram of the other of the two IC boards on which the digital display (other read-out) circuit is mounted.

In FIG. 4 details of the amplifier and suppressor indication circuits are shown. In addition to the detectors 42a–42d and 48a–48d there is included a series of amplification stages for successively amplifying the signals produced by the detectors 42a–42d and 48a–48d. The detectors 42a, 48a are connected to an amplifier 62, while the detectors 42b, 48b; 42c, 48c; and 42d, 48d are connected to amplifiers 64, 66 and 68, respectively. In turn, the outputs from amplifiers 62 and 64 are connected as the two inputs to an amplifier 70, and the outputs from amplifiers 66 and 68 are connected as the two inputs to an amplifier 72. The outputs from the amplifiers 70 and 72 are connected as the two inputs to an amplifier 74. The amplifier 74 is connected to an amplifier 76 and the amplifier 76 is connected to the amplifier 78. The amplifiers 62–76 are feedback amplifiers each with a trimming resistor 80–94, respectively, to adjust the output of the respective amplifier. The amplifiers 62–72, additionally have a point 96–106, respectively, to test amplifier operation.

The amplifier 78 is connected at its output to comparators 108 and 110. The comparator 108 is connected through a transistor 112 to LED 114, while the comparator 110 is connected to LED 116. The LED 114 is displayed as a green light, and the LED 116 is displayed as a red light. Both the LED 114 and the LED 116 form part of the digital display 46.

Comparators 108 and 110 receive a signal at one input from the amplifier 78. This signal is conditioned by the voltage divider 118, 120. The resistor 120 comprises five different resistors 120a–120e which are variously selected by the switch 58. The resistors 120a–120e are chosen to represent different engine torque settings. For example, resistor 120a is selected at 40% engine torque; resistor 120b at 60% engine torque; resistor 120c at 80% engine torque; resistor 120d at 100% engine torque; and resistor 120e at 120% engine torque. The conditioned signal is compared to a reference or threshold value which is separately applied to the other input of each comparator via a variable resistor 122, 124. The resistors are independetly set to determine the reference value of the comparator.

The output of amplifier 74 is tapped at lead 126 and serves as an input to the digital display circuit shown in FIG. 5. To provide a sufficient voltage level to the digital display circuit, the input signal at lead 126 is increased by amplifier 128, the output of which is connected to an analog-to-digital converter 130 via the switch 56a. The switch 56a, and consequently the switch 56b, is placed in the upper position to detect the infrared radiation emitted by the helicopter suppressor 16, which is translated into an absolute temperature reading of the engine exhaust passing the suppressor. The digital display 46 will then indicate this radiation level as a temperature reading. To obtain a zero setting the switch 56a, and consequently the switch 56b, is placed in the lower position. The ambient temperature is sensed by control-rectified diodes 132–138 which are signal diodes made from transistors. In series with the signal diode 132 is a voltage reference diode 140.

The analog voltage from the ambient or absolute temperature circuit is applied to the analog-to-digital converter 130 where a digitally encoded value is generated, proportional to the analog signal. This digital value is then sent to a decoder 142 which interprets the digital signal and commands the appropriate LED segments of the digital display 46 to illuminate. The digital display will then indicate the infrared energy sensed by the device in watts per steradian. The digital display 46 is cleared by pulses from the decoder 142 which causes transistors 144–150 to conduct.

The read/hold switch 60 is actuated to retain the digital value on the display after using the device to sense suppressor heat radiation. This allows the operator to hold the value on the display so that the operator may show the value to the helicopter pilot, for instance. Without the read/hold switch 60, if the device operator were to move after sensing the radiated heat, the indicated digital value would change since the sensed infrared heat is an exponential function of distance from the sensed object to the detector.

The infrared detection device is typically powered by two 9 volt batteries. With minor changes, other than 9 volt batteries may be used. The circuitry of the device, however, is a great drain on the power source. To avoid unnecessary consumption of power, a timer 152 is provided which energizes a relay 154 to automatically shut off the device. The relay 154 forms part of the switch 54. Typically, the timer allows energizing of the circuits, for example, for seven seconds.

Also shown in FIG. 5 is a circuit 156 which receives sign and digit signals from the A/D converter 130. The circuit 156 is comprised of a flip-flop 158 and a NOR gate 160, connected to control the digital display 46. NOR 160 is connected to receive a signal from any of the three clear lines 162. The NOR 160, in turn, energizes transistor 144 which clears the negative sign of the display. Flip-flop 158 receives sign signals and ones-digit signals which advance the flip-flop. The signal from flip-flop 158 energizes transistor 164 to control the application of, for example, +6 volts to the display via transistor 166.

The circuit of FIG. 5 includes a pair of voltage regulators 168 and 170. If a voltage increase occurs at the source, greater current will flow through transistor 172 and resistor 174 in regulator 168 or transistor 176 and resistor 178 in regulator 170. This causes a greater voltage to be applied to the base of transistors 180, 182 which energizes transistors 184, 186, respectively. Transistors 184, 186 cause pnp transistors 172, 176 to block partially, thus reducing the current through the collector-emitter legs of transistors 172, 176 in the manner of negative feedback.

CORRELATION AND ASSEMBLY

The vulnerability detection device must be correlated to the particular engine to be inspected. This is done by knowing the acceptable IR radiation levels emitted by the engine as suppressed for varying engine torque settings. The need for knowing the IR radiation levels emitted at varying engine torque settings is due to the fact that a helicopter operates at varying torque settings and the IR radiation level emitted varies with engine torque. A satisfactory emission at one torque setting does not necessarily signify that the emission levels at all torque settings will be satisfactory. Typically, 40%, 60%, 80%, 100% and 120% torque settings are monitored. An acceptable IR radiation level is a safe IR radiation level, i.e., a level as noted above, which is insufficient to support the generation of a homings signal.

The circuit board including the amplifier circuit (FIG. 4) is designed to achieve the noted correlation by properly selecting the value of the resistors 120a-120e in conjunction with the value of the resistors 118, 122 and 124. The value of the reference resistors 122 and 124 are chosen for a torque setting of 40% (switch 58 connected to resistor 120a). The radiation emitted by a given engine at a 40% torque setting and suppressed by the suppressor 16 to a safe level, as previously defined, yields a certain voltage level at the point 188. This voltage level can be ascertained. Knowing this voltage level and the voltage in the positive line 190, allows for a precise determination of the value for the resistance of the resistor 122, and consequently the threshold level of the voltage applied to the positive input to the comparator 108. Accordingly, all safe radiation emissions will produce a voltage at the point 188 which is lower than the threshold voltage. This lower voltage is applied to the negative input to the comparator 108. As a result, the output of the comparator 108 is positive, causing the transistor 112 to conduct through the LED 114 to ground 192. The illumination of LED 114 indicates that the radiation emitted and sensed is safe. In a like manner, the resistance of the resistor 124 is similar to that of the resistor 122. The resulting voltage is applied to the negative input of the comparator 110. Consequently, the voltage at the point 188 associated with safe radiation emissions is applied to the positive input of the comparator 110 which results in a negative voltage output of the comparator 110, which is negative relative to the ground 192. As a result, the LED 116 is off. All unsafe radiation levels will produce a voltage at the point 188 which reverses the operation of the comparators 108 and 110. Thus, the transistor 112 will be blocked turning off the LED 114, while the voltage output from the comparator 110 will be positive resulting in illumination of LED 116. Illumination of the LED 116 indicates that the radiation emitted and sensed is unsafe.

Each circuit board can be readily mounted within the cylindrical body 20, for example, one on each side of the axis A—A so as not to interfere with visual citing of the target, and they can be connected together and with the switches 54, 56 and 58 located in the handgrip 22.

The optics including the target viewing optical system and the IR radiation focusing optical system are fixed focal point systems, i.e., they cannot be adjusted. This condition is preferred for simplicity. While this condition is preferred, adjustable focal point systems are known and could be employed. The lens 34 of the target viewing optical system comprises, preferably, a 1.0 inch diameter lense with a focal length of 3.5 inches, and the lense 36 comprises, preferably, an 18 mm diameter lense with a focal length of −89 mm. The digital display is therefore located 3.5 inches from the lense 34.

The lenses 40a-40d of the radiation focusing optical system comprise, preferably, 0.5 inch diameter and 0.5 inch focal length sapphire lenses. These lenses are preferably located at a radius of 0.875 inches from the axis A—A (FIG. 2) and at approximately the 2, 5, 8 and 11 o'clock positions when looking into the optics (FIG. 3). Each of the lenses 40a-40d focuses the incoming radiation energy on a respective one of the detectors 42a-42d which are preferably indium arsenide detectors located at the focal point of its respective lense. In front of each detector there is located, as noted above, a filter 44a-44d. Preferably, these filters are 0.040 inch thick germanium long wavepass filters.

Preferably, the cylindrical body 20 is made of aluminum. All other body components: the inner body; the handgrip; the optics holder; the aperture ring; the aperture retainer; the eye piece; and the eye piece retaining ring are preferably machined out of Debrin bar stock. The components can be attached by means of screws to form the assembly.

OPERATION

Operation of the detection device is accomplished by an operator assisted by the helicopter pilot. Referring again to FIG. 1, the operator measures an arc of approximately 20 feet from the center of the suppressor outlet. A point on this arc, preferably 20° forward from the suppressor centerline, is selected from which to check the emission levels from the suppressor 16. The operator aims the detection device 18 at the exhaust opening of the suppressor 16 with the engine off. The aperture ring 28 is rotated to expose the sensors 48a-48d and cover the sensors 42a-42d. Power to the detection device is turned on by pressing switch 54. In addition, a 20 foot arc is selected for the specific fixed focal point optics identified above. The arc radius will vary depending on the optics chosen. The operator aims the detection device 18 at the exhaust opening of the suppressor 16 with the engine off. The aperture ring 28 is rotated to expose the sensors 48a-48d and cover the sensors 42a-42d. Power to the detection device is turned on by pressing the switch 54. The device is now set to take an ambient temperature reading. The sensors 48a-48d generate signals indicative of the engine surrounds (ambient condition). These signals are amplified through amplifier 74 and amplifier 128. The amplifier signal is applied through switch 56a in its upper position to the A/D converter 130, which together with the decoder 142 causes a reading to be displayed on the digital display 46. At this point, the operator rotates switch 56 so that both switches 56a and 56b are rotated down (FIG. 5). This causes the digital reading to register as a negative value because of the NOR gate 160 and its associated circuitry. Next the operator rotates switch 56 back so that switches 56a and 56b are in their upper position. The operator also rotates the aperture ring 28 back to expose the lenses 40a-40d and associated detectors 42a–42d and filters 44a–44d, and rotates switch 58 to engage resistor 120a into the circuit. The operator now signals the pilot to turn on the engine to a 40% torque setting. The operator aims the detection device 18 at the exhaust opening of the suppressor 16. The IR energy emitted is focused by the lenses 40a–40d, is filtered by the filters 44a–44d and detected by the detectors 42a–42d. The detectors generate appropriate electrical signals which are amplified by the various stages of the amplifier circuit. The output of the amplifier 74 is as before, further amplified by the amplifier 128 and applied to the A/D converter 130. The converter 130 and decoder 142 produce a digital reading on the digital display 46. In arriving at this reading, the previous negative count is cleared so that the resulting positive count is a temperature measurement of the IR radiation corrected for ambient conditions.

The output of the amplifier 74 is also further amplified by amplifiers 76 and 78, and the output of the amplifier 78 applied to both comparators 108 and 110. As noted above, if the radiation level is safe the output of the comparator 108 will be positive and the LED 114 will be illuminated (green). If the radiation level is unsafe, the LED 116 will be illuminated instead (red) indicating to the operator that the suppressor 16 is not functioning prop- erly.

The operator next signals the pilot to increase the engine torque to 60%. When the engine is set at 60% torque, the voltage at point 188 will increase LED 114 to turn-off and LED 116 to turn-on. The operator then rotates switch 58 to engage resistor 120b into the circuit. With the introduction of resistor 120b, the voltage at point 188 will drop sufficiently to cause LED 114 to once again turn-on and LED 116 to turn-off, if the radiation level at the 60% torque setting is at a safe level. The operator and pilot continue this procedure through all engine torque settings.

What is claimed is:

1. An infrared detection device for detecting the infrared energy emitted by an engine at varying torque settings, at a location remote from the engine, comprising:
    detecting means for detecting the level of the infrared energy emitted by the engine and generating an electrical signal as a function of the level of the infrared energy emitted; and
    indicating means including means for conditioning the indicating means for a given engine torque setting, to establish thereby an acceptable level of the infrared energy emitted for the given engine torque setting,
    siad indicating means being connected to the detecting means for receiving the electrical signal generated by the detecting means and providing a visual indication of the level of the infrared energy detected and whether the infrared energy emitted for the given engine torque setting is above or below the acceptable level.

2. The infrared detection device as defined in claim 1, wherein the indicating means also includes means for conditioning the indicating means for ambient conditions surrounding the engine.

3. The infrared detection device as defined in claim 1, wherein the detecting means comprises:
    at least one optical sensor which receives the infrared energy emitted and generates an electrical signal as a function of the level of the infrared energy emitted; and
    an amplifier circuit connected to said at least one optical sensor for amplifying the electrical signal generated by said at least one optical sensor for use by the indicating means.

4. The infrared detection device as defined in claim 1, wherein the indicating means comprises:
    a digital display which indicates the temperature of the engine exhaust; and
    a light display which indicates that the level of the infrared energy emitted is above or below the acceptable level.

5. The infrared detection device as defined in claim 1, wherein the means for conditioning the indicating means for a given engine torque setting comprises a variable resistor switch.

6. The infrared detection device as defined in claim 4, wherein the detecting means comprises:
    at least one optical sensor which receives the infrared energy emitted and generates an electrical signal as a function of the level of the infrared energy emitted;
    an amplifier circuit connected to said at least one optical sensor for amplifying the electrical signal generated by said at least one optical sensor for use by the indicating means; and
    lens means for viewing the infrared energy emitted by the engine and determining thereby the proper distance for the device from the emitted energy, and for viewing the digital display.

7. The infrared detection device as defined in claim 3, wherein the detecting means further comprises:
    at least one optical sensor which generates an electrical signal as a function of the ambient energy level surrounding the engine,
    said last named optical sensor being connected to said amplifier circuit for amplifying the electrical signal generated by said last named optical sensor for use by the indicating means.

8. A portable, hand held, infrared detecting device for detecting the infrared energy emitted by an engine at varying torque settings, at a location remote from the engine, comprising:
    a handgrip;
    a body connected to the handgrip, said body containing infrared energy detecting optics, infrared energy viewing optics, and visual indicating means,
    said visual indicating means indicating the level of the infrared energy detected and whether the infrared energy emitted for a given engine at a given engine torque setting is above of below an acceptable level.

9. The portable, hand held, infrared detection device as defined in claim 8, wherein the visual indicating means includes an amplifier circuit connected to the infrared energy detecting optics.

* * * * *